(No Model.)
G. E. BEACH.
System of Water Supply for Cities and Towns.
No. 233,594. Patented Oct. 26, 1880.
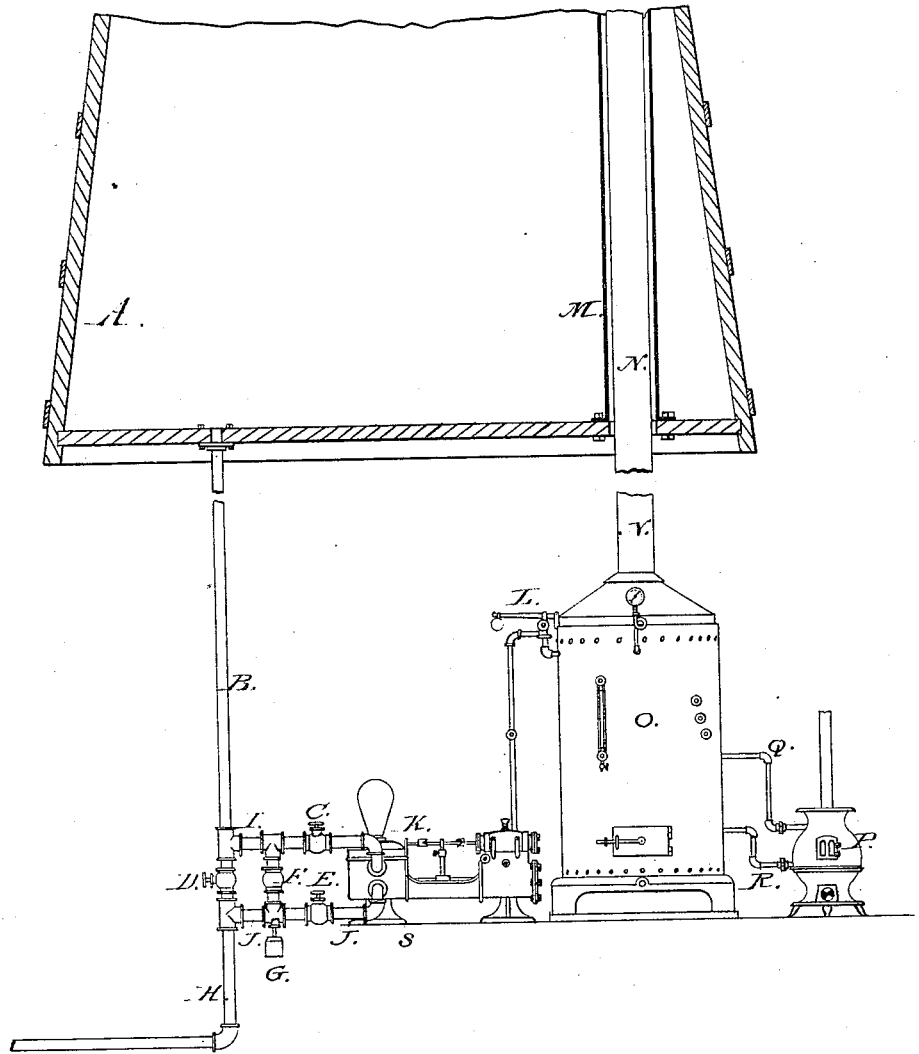
WITNESSES
Charles R. Searle
Charles C. Stetson
INVENTOR
George E. Beach
by his attorney
J. L. Stetson

UNITED STATES PATENT OFFICE.

GEORGE E. BEACH, OF MARSHALLTOWN, IOWA.

SYSTEM OF WATER-SUPPLY FOR CITIES AND TOWNS.

SPECIFICATION forming part of Letters Patent No. 233,594, dated October 26, 1880.

Application filed June 1, 1880. (No model.)

*To all whom it may concern:*

Be it known that I, GEORGE E. BEACH, a citizen of the United States, residing at Marshalltown, Marshall county, in the State of Iowa, have invented certain Improvements relating to Water-Supply for Towns, of which the following is a specification.

My invention relates to a system of water-supply for towns and cities wherein the water, as it courses through the pipes, answers both the ordinary purpose for household and domestic uses and at the same time, having received a strong propulsion, serves as a fire extinguisher also without the introduction of portable engines or other apparatus, as is commonly used in throwing water for fire-extinguishing purposes.

The object of the invention is to supply cities and towns with water for ordinary purposes by means of an elevated reservoir which relies for its efficiency upon the hydrostatic equilibrium, and, in combination with this means, to provide an effective power-pump driven by steam or any other available power, with provision for connecting and disconnecting at will, to give an additional force to the water when required, which will render the flow strong enough to be of effective use in extinguishing fires; and also to provide an automatic relief which will allow the water to escape and to flow again around through the pump whenever the strain would otherwise become dangerous.

In carrying out this invention I place an elevated tank or reservoir at a sufficient elevation relatively to the city or town to be supplied to furnish water for ordinary purposes by means of hydrostatic equilibrium. The tank may be supplied with water by the natural flow of a stream, by a windmill, hydraulic ram, or any other suitable means. I provide, also, a system of pipes leading off from this to carry the water wherever it may be needed.

In connection with the tank, and either directly underneath or at some convenient point, I connect one or more pumps, or their equivalents, in such manner as to take their supply of water from the tank, or from the pipe near the tank, and force it into the pipes leading into the town or city at the high pressure required for fire-extinguishing purposes. I prefer a pump for this purpose so constructed as to receive the water in its upper side and discharge from its lower, in order to avoid friction of unnecessary angles in the current of the water, and thereby lessening the force given it by the head in the tank. I also provide the pump with a relief-valve with connection adjusted in such a manner as that when the pressure on the pump exceeds a desired limit, or when one or more of the hydrants are suddenly closed and the reflex might cause injury, the relief-valve will open and allow the water from the pumps to be returned to the tank, or to that part of the pipe near the tank, without causing an undue strain on the discharge-pipes or any waste of water.

I do not pretend to have been the first to conceive the idea of furnishing water to cities and towns by means of the elevated tank, nor of forcing water through pipes for fire-extinguishing purposes; but my invention consists in effecting these two objects through one system of pipes without loss of water or of force or pressure in the water, thus making an efficient and economical system of water-works.

In large towns and cities, where it would be impracticable to use one elevated tank or reservoir of sufficient capacity for the town, two or more may be connected together to increase the capacity, as desired. Each may supply one pump; or the city may be divided into sections or districts, each district having its own elevated tank and pump, but having its pipes connected with pipes of adjoining districts, with shut-off valves at intersecting points, so that in case of a large fire any one district may be aided by any adjoining district simply by opening the shut-off valve separating any two such districts; or the entire system of the city may by the same means be brought to bear upon any one point or at several points at the same time.

The accompanying drawing illustrates my approved arrangement of tank, pump, and pipes as used in my invention. It is a side elevation, partly in section.

A portion of the elevated tank is shown at A. This is placed at a sufficient elevation to distribute the water for ordinary purposes by hydrostatic pressure, and is of sufficient capacity for both ordinary and fire-extinguishing purposes.

A stand-pipe, B, takes the water from the reservoir to the pump through the suction-pipe I. C is a shut-off valve in the pipe I, and D a shut-off valve in the stand-pipe below its connection with the suction-pipe.

K is the pump, arranged to receive the water above and discharge it from the bottom. A discharge-pipe, J, leads from the pump to the stand-pipe, entering it below the shut-off valve D. The pipe J is provided with a shut-off valve, E.

F is the relief-valve between the suction and discharge pipes, and G is a weight suspended from it. The shut-off valves C and E lie between the pump and the relief-valve. By this arrangement of valves in relation to the pipes and pump the water used for ordinary purposes flows through without being subjected to the action of the pump, if so desired.

A main pipe, H, leads from the stand-pipe, and from it ramify such a system of pipes as may be needed in the town. The pump K sits upon the foundation S.

A boiler, O, for generating steam to drive the pump, is conveniently located and connected with the pump by a suitable pipe, in which is placed a throttle-valve, L. The smoke-stack N of the boiler passes out through the stand-pipe M in the tank.

A heater, P, may be placed in convenient proximity to the boiler and connected with it by water-pipes Q and R.

A constant fire is maintained in the heater P, and the water in the boiler O is constantly kept at boiling-point, while no fire is kept in the boiler. When the water is needed for fire-extinguishing purposes a fire can be immediately kindled in the boiler, which will furnish steam at once sufficient to drive the pump. In this way I am enabled to work my apparatus and keep it ready for instantaneous use at a minimum expense.

The arrangement of the boiler and the smoke-pipe as shown allows a portion of the heat radiated from both to be imparted to the water in the tank. The heat thus utilized is important in winter, tending to maintain the elevated tank clear of ice.

Any required pressure can be obtained in the pipes, as any number of pumps and pumps of any capacity may be used.

By the use of my invention the water is at all times ready for fire-extinguishing purposes at a very limited expense and with superior efficiency and dispatch.

I am aware that similar heaters to the one described have been used for portable steam fire-engines for the purpose of keeping them in readiness for action. Therefore I do not claim either heater, boiler, or pump, except when used in combination with an elevated tank or reservoir.

What I claim is—

1. The pump K, with means for operating it, in combination with the stand-pipe B, leading from the reservoir A, the pipe H, leading to the town, a pipe and valve, D, forming a direct connection, pipes I and J, with valves C and E, forming the connection through the pump for giving fire-pressure when desired, and a separate connection having a self-acting valve, F, serving to allow the water to pass from the pipe J to the pipe I whenever the pressure becomes excessive, substantially as described.

2. The combination of the tank A and a pipe, M, passing up through it, with the boiler O and the smoke-pipe N therefrom, so that while the draft from the boiler is not impeded the heat radiated from the smoke-pipe is communicated to the water in the tank, substantially as herein specified.

In testimony whereof I have hereunto set my hand in the presence of two subscribing witnesses.

GEORGE E. BEACH.

Witnesses:
GEO. W. CARTER,
MYRON W. SCOTT.